United States Patent
Heinecke et al.

(10) Patent No.: US 11,768,681 B2
(45) Date of Patent: Sep. 26, 2023

(54) APPARATUS AND METHOD FOR VECTOR MULTIPLY AND ACCUMULATE OF PACKED BYTES

(71) Applicant: Intel Corporation, Santa Clara, CA (US)

(72) Inventors: Alexander Heinecke, San Jose, CA (US); Dipankar Das, Pune (IN); Robert Valentine, Kiryat Tivon (IL); Mark Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 15/879,419

(22) Filed: Jan. 24, 2018

(65) Prior Publication Data

US 2019/0042236 A1 Feb. 7, 2019

(51) Int. Cl.
*G06F 9/30* (2018.01)
*G06F 9/38* (2018.01)

(52) U.S. Cl.
CPC .......... *G06F 9/3001* (2013.01); *G06F 9/3013* (2013.01); *G06F 9/30014* (2013.01); *G06F 9/3016* (2013.01); *G06F 9/30018* (2013.01); *G06F 9/30036* (2013.01); *G06F 9/3893* (2013.01)

(58) Field of Classification Search
CPC .............. G06F 9/3001; G06F 9/30014; G06F 9/30018; G06F 9/30036; G06F 9/3013; G06F 9/3016; G06F 9/3893; G06F 9/3867

See application file for complete search history.

(56) References Cited

U.S. PATENT DOCUMENTS 6,385,634 B1 * 5/2002 Peleg ................... G06F 7/4812
708/490
7,085,795 B2 * 8/2006 Debes ................ G06F 9/30014
708/319

(Continued)

*Primary Examiner* — Corey S Faherty
(74) *Attorney, Agent, or Firm* — NICHOLSON DE VOS WEBSTER & ELLIOTT LLP

(57) ABSTRACT

An apparatus and method for performing multiply-accumulate operations. For example, one embodiment of a processor comprises: a decoder to decode instructions; a first source register to store a first plurality of packed bytes; a second source register to store a second plurality of packed bytes; a third source register to store a plurality of packed doublewords; execution circuitry to execute a first instruction, the execution circuitry comprising: extension circuitry to sign-extend or zero-extend the first and second plurality of packed bytes to generate a first and second plurality of words corresponding to the first and second plurality of packed bytes; multiplier circuitry to multiply each of the first plurality of words with a corresponding one of the second plurality of words to generate a plurality of temporary products; adder circuitry to add at least a first set of the temporary products to generate a first temporary sum; accumulation circuitry to combine the first temporary sum with a first packed doubleword value from a first doubleword location in the third source register to generate a first accumulated doubleword result; a destination register to store the first accumulated doubleword result in the first doubleword location.

24 Claims, 17 Drawing Sheets

(56) References Cited

U.S. PATENT DOCUMENTS

| | | | |
|---|---|---|---|
| 7,430,578 B2* | 9/2008 | Debes | G06F 9/30014 |
| | | | 708/603 |
| 8,271,571 B2* | 9/2012 | Matsuyama | G06F 7/5443 |
| | | | 708/622 |
| 2002/0065860 A1* | 5/2002 | Grisenthwaite | G06F 9/30014 |
| | | | 708/207 |
| 2004/0073589 A1* | 4/2004 | Debes | G06F 9/30014 |
| | | | 708/523 |

* cited by examiner

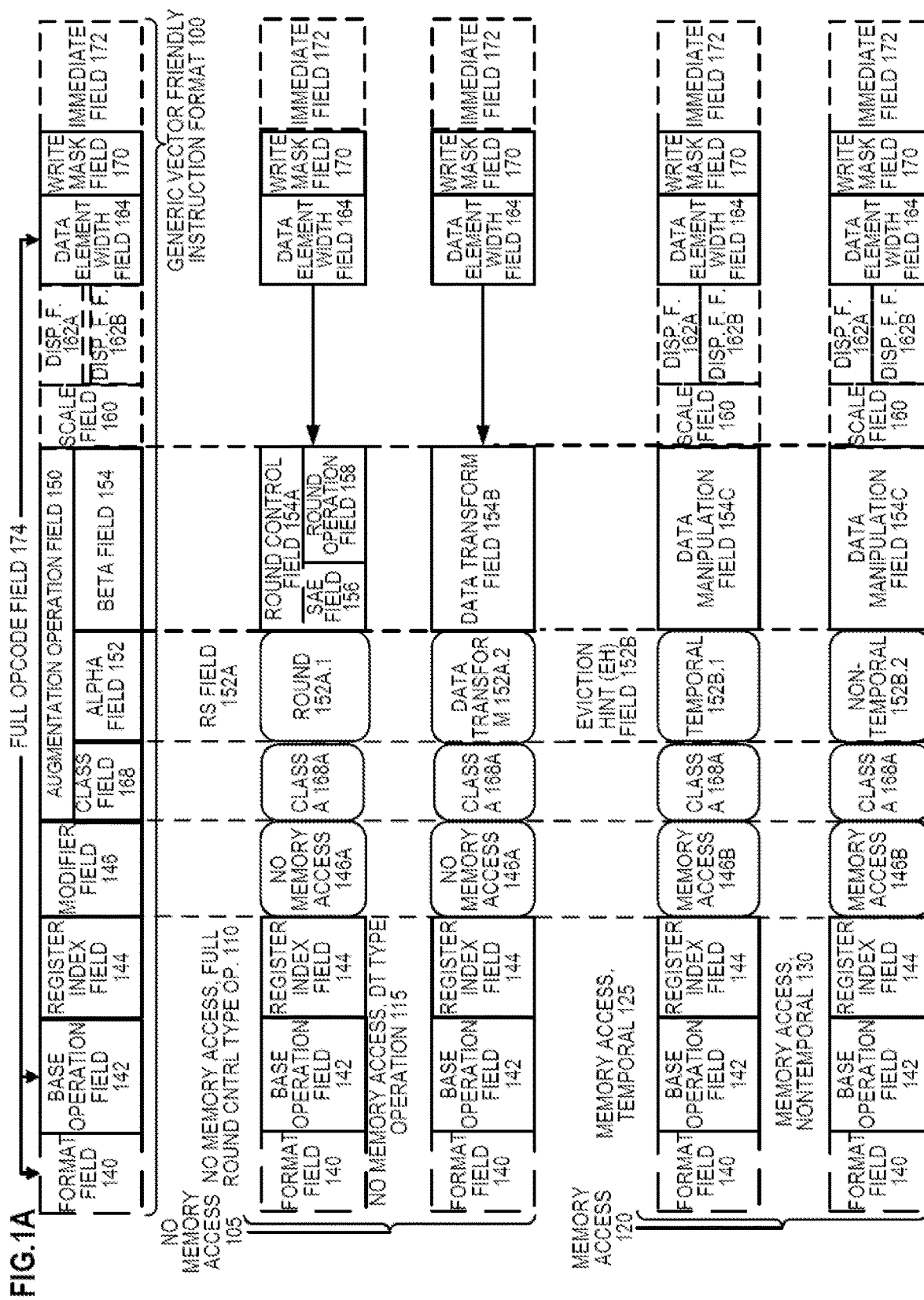

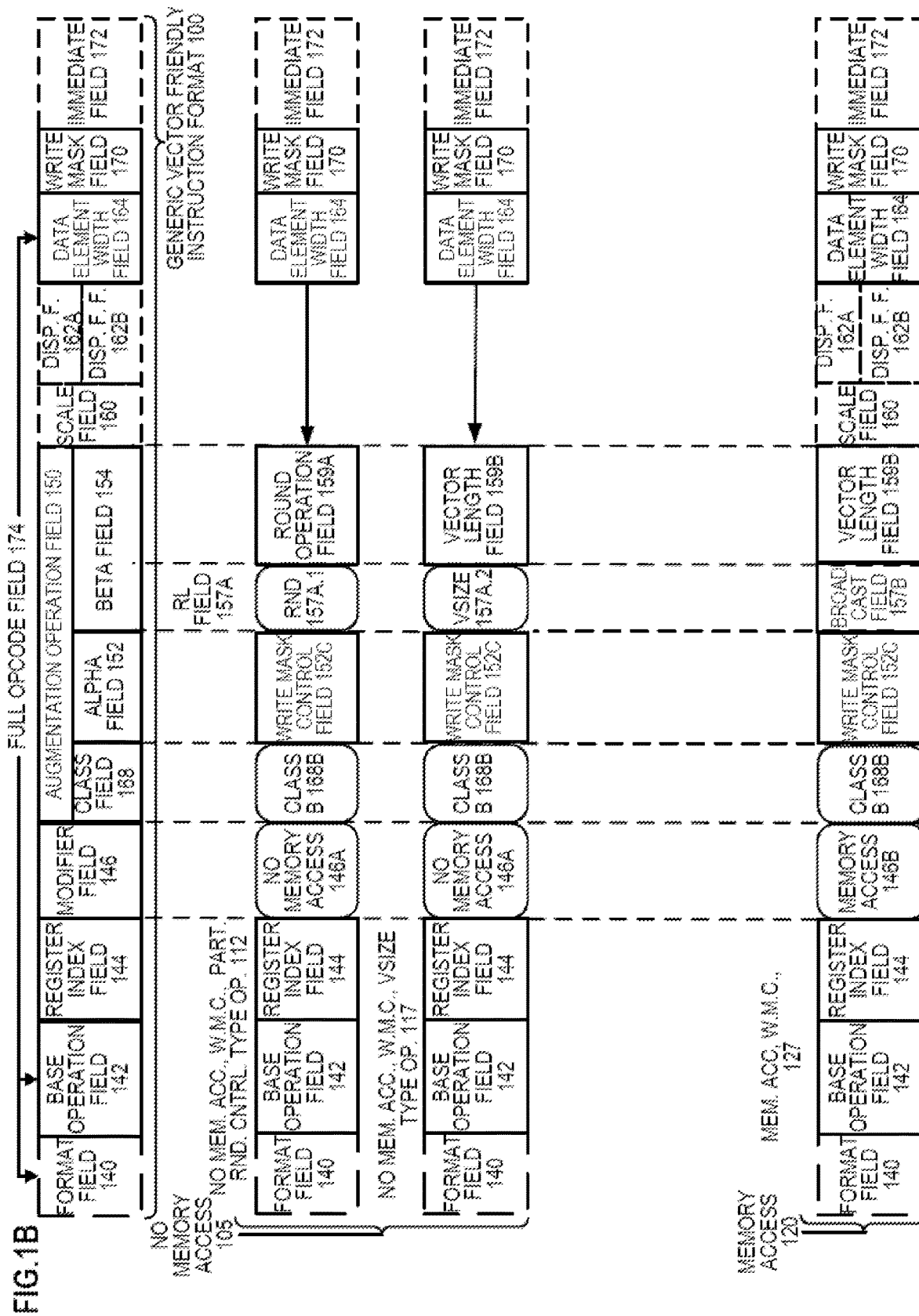

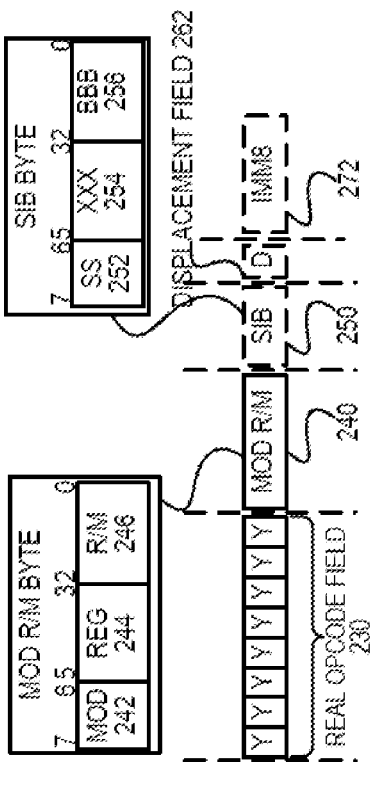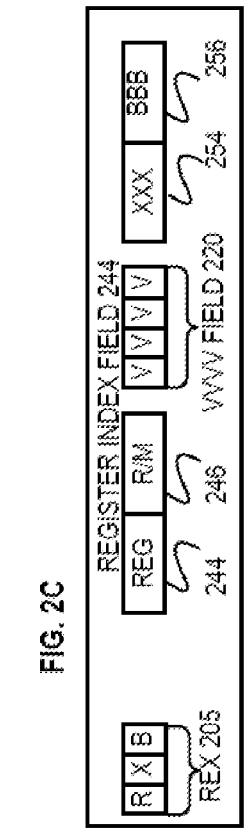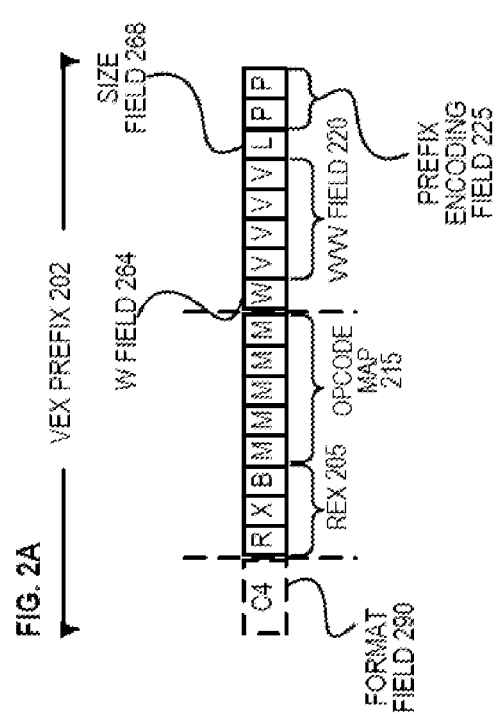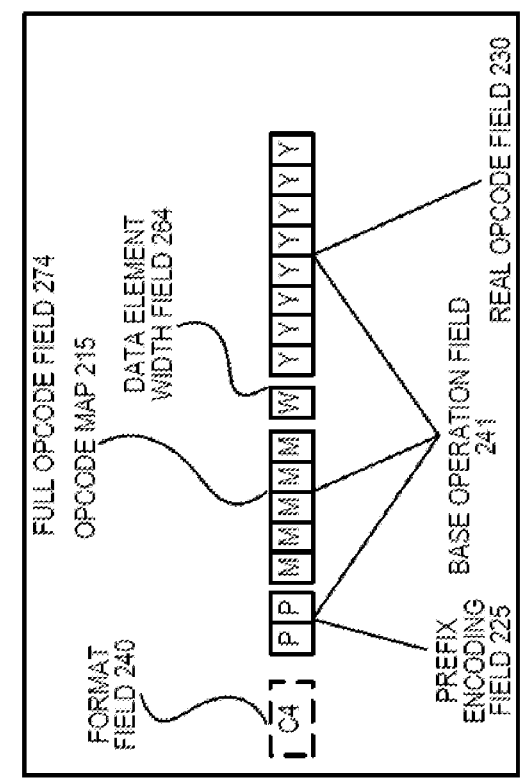

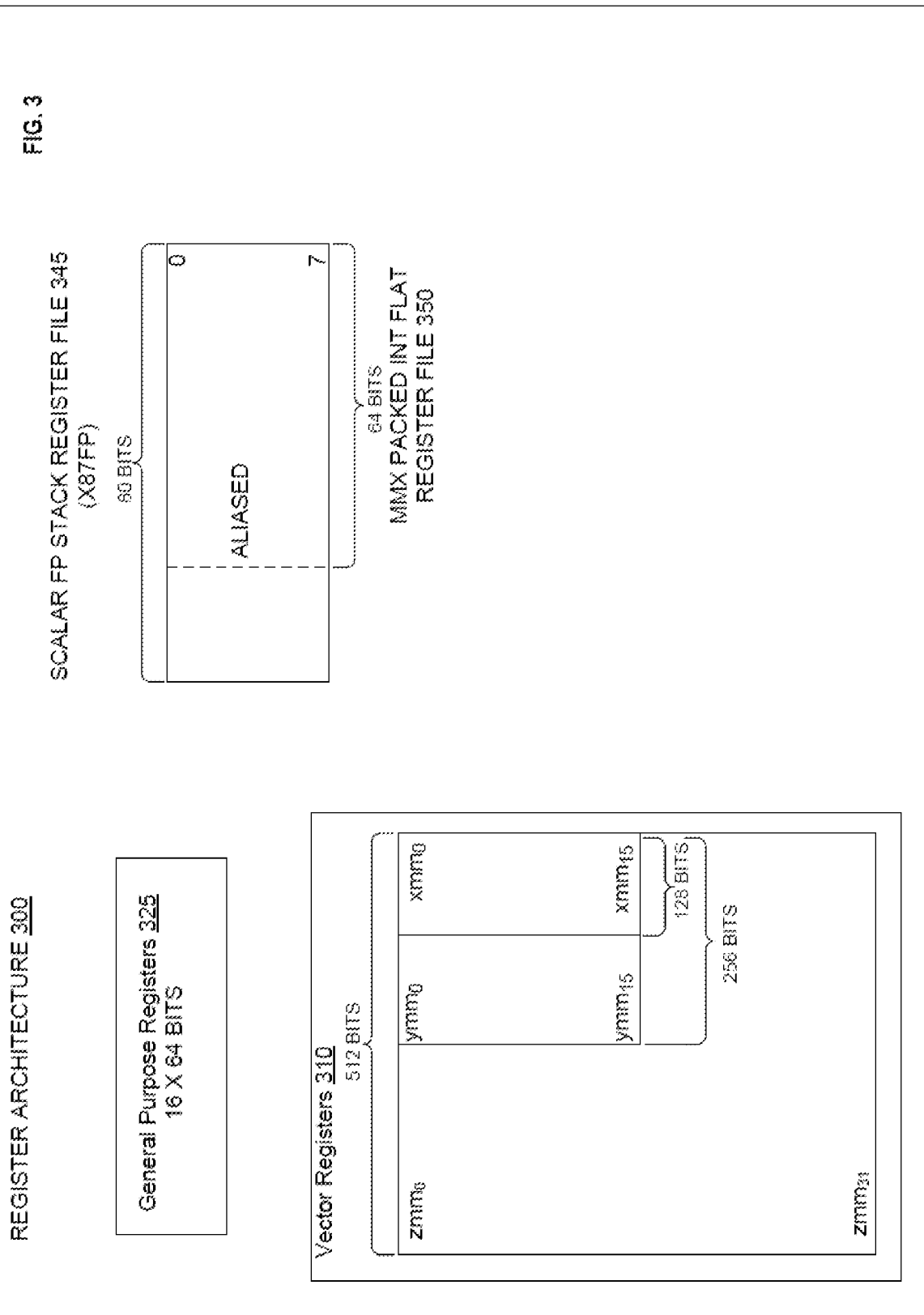

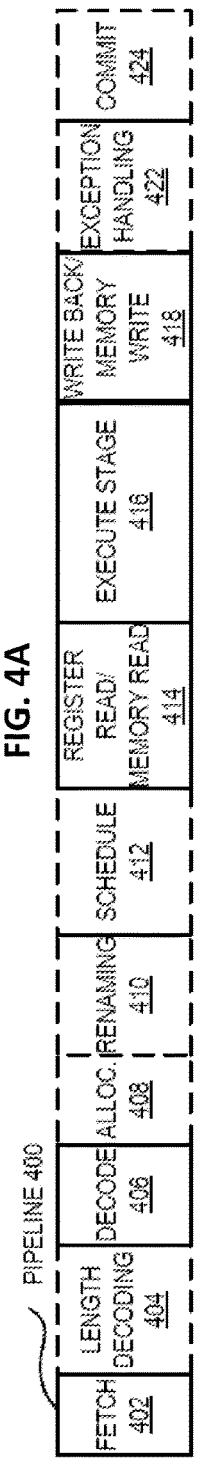
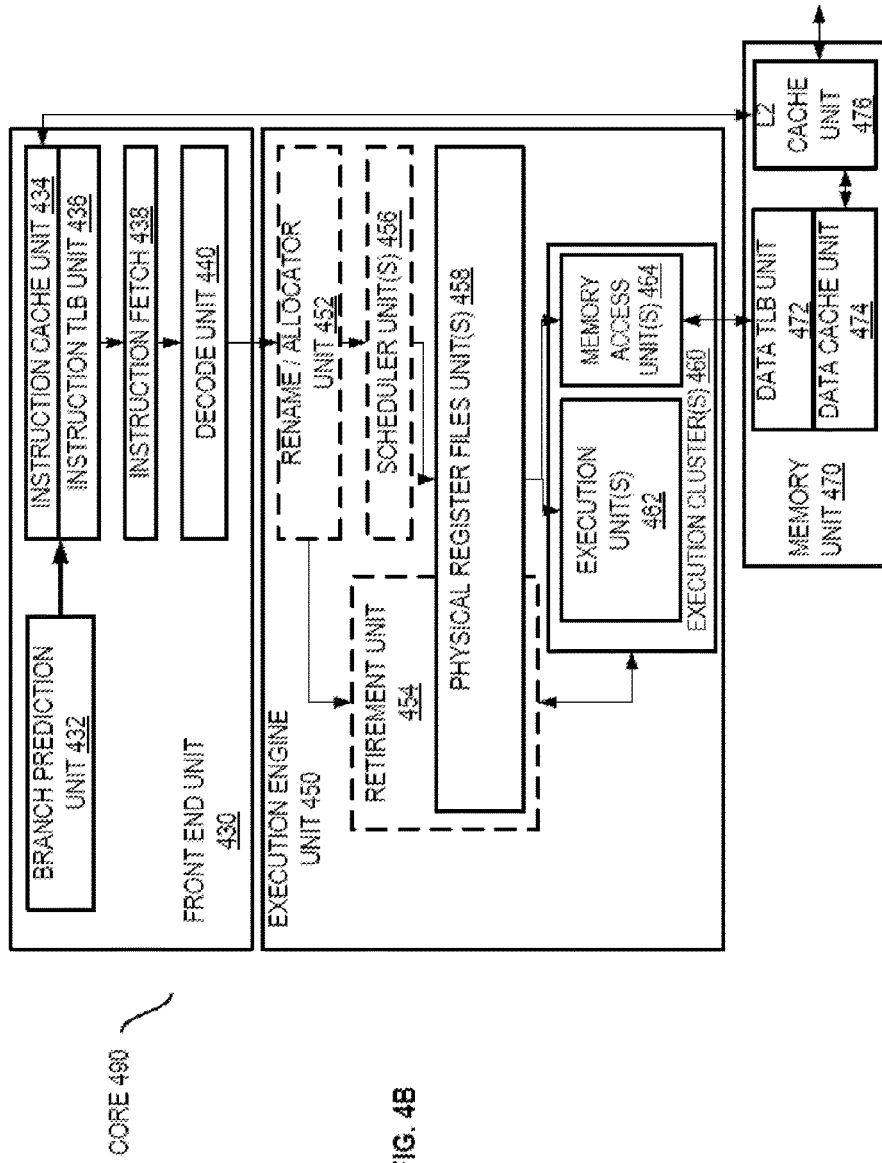

| Encoding / Instruction | Op/En | CPUID |
|---|---|---|
| EVEX.DDS.128.F2.0F38.W0 50 /r<br>VPDPBSSD xmm1{k1}{z}, xmm2, xmm3/m128/m32bcst | A | AVX512_VNNI2<br>AVX512VL |
| EVEX.DDS.256.F2.0F38.W0 50 /r<br>VPDPBSSD ymm1{k1}{z}, ymm2, ymm3/m256/m32bcst | A | AVX512_VNNI2<br>AVX512VL |
| EVEX.DDS.512.F2.0F38.W0 50 /r<br>VPDPBSSD zmm1{k1}{z}, zmm2, zmm3/m512/m32bcst | A | AVX512_VNNI2 |
| EVEX.DDS.128.F3.0F38.W0 50 /r<br>VPDPBSUD xmm1{k1}{z}, xmm2, xmm3/m128/m32bcst | A | AVX512_VNNI2<br>AVX512VL |
| EVEX.DDS.256.F3.0F38.W0 50 /r<br>VPDPBSUD ymm1{k1}{z}, ymm2, ymm3/m256/m32bcst | A | AVX512_VNNI2 |
| EVEX.DDS.512.F3.0F38.W0 50 /r<br>VPDPBSUD zmm1{k1}{z}, zmm2, zmm3/m512/m32bcst | A | AVX512_VNNI2 |
| EVEX.DDS.128.NP.0F38.W0 50 /r<br>VPDPBUUD xmm1{k1}{z}, xmm2, xmm3/m128/m32bcst | A | AVX512_VNNI2<br>AVX512VL |
| EVEX.DDS.256.NP.0F38.W0 50 /r<br>VPDPBUUD ymm1{k1}{z}, ymm2, ymm3/m256/m32bcst | A | AVX512_VNNI2 |
| EVEX.DDS.512.NP.0F38.W0 50 /r<br>VPDPBUUD zmm1{k1}{z}, zmm2, zmm3/m512/m32bcst | A | AVX512_VNNI2 |
| EVEX.DDS.128.F2.0F38.W0 51 /r<br>VPDPBSSDS xmm1{k1}{z}, xmm2, xmm3/m128/m32bcst | A | AVX512_VNNI2<br>AVX512VL |
| EVEX.DDS.256.F2.0F38.W0 51 /r<br>VPDPBSSDS ymm1{k1}{z}, ymm2, ymm3/m256/m32bcst | A | AVX512_VNNI2<br>AVX512VL |
| EVEX.DDS.512.F2.0F38.W0 51 /r<br>VPDPBSSDS zmm1{k1}{z}, zmm2, zmm3/m512/m32bcst | A | AVX512_VNNI2 |
| EVEX.DDS.128.F3.0F38.W0 51 /r<br>VPDPBSUDS xmm1{k1}{z}, xmm2, xmm3/m128/m32bcst | A | AVX512_VNNI2<br>AVX512VL |
| EVEX.DDS.256.F3.0F38.W0 51 /r<br>VPDPBSUDS ymm1{k1}{z}, ymm2, ymm3/m256/m32bcst | A | AVX512_VNNI2<br>AVX512VL |
| EVEX.DDS.512.F3.0F38.W0 51 /r<br>VPDPBSUDS zmm1{k1}{z}, zmm2, zmm3/m512/m32bcst | A | AVX512_VNNI2 |
| EVEX.DDS.128.NP.0F38.W0 51 /r<br>VPDPBUUDS xmm1{k1}{z}, xmm2, xmm3/m128/m32bcst | A | AVX512_VNNI2<br>AVX512VL |
| EVEX.DDS.256.NP.0F38.W0 51 /r<br>VPDPBUUDS ymm1{k1}{z}, ymm2, ymm3/m256/m32bcst | A | AVX512_VNNI2<br>AVX512VL |
| EVEX.DDS.512.NP.0F38.W0 51 /r<br>VPDPBUUDS zmm1{k1}{z}, zmm2, zmm3/m512/m32bcst | A | AVX512_VNNI2 |

FIG. 14

APPARATUS AND METHOD FOR VECTOR MULTIPLY AND ACCUMULATE OF PACKED BYTES

BACKGROUND

Field of the Invention

The embodiments of the invention relate generally to the field of computer processors. More particularly, the embodiments relate to an apparatus and method for performing vector multiply and accumulate of packed bytes.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

Multiply-accumulate is a common digital signal processing operation which computes the product of two numbers and adds that product to an accumulated value. Existing single instruction multiple data (SIMD) microarchitectures implement multiply-accumulate operations by executing a sequence of instructions. For example, a multiply-accumulate may be performed with a multiply instruction, followed by a 4-way addition, and then an accumulation with the destination quadword data to generate two 64-bit saturated results.

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention; and FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

FIG. 14 illustrates a set of instructions for performing multiply-accumulate operations;

DETAILED DESCRIPTION

Figure 5B:
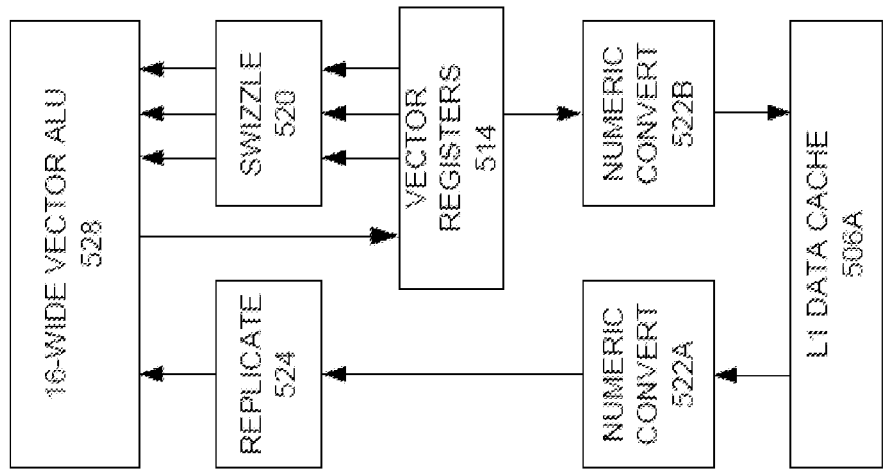
FIG. 5B illustrates an expanded view of part of the processor core in FIG. 5A according to embodiments of the invention.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operands and sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*index+base$).

Displacement Field 162A—its content is used as part of memory address generation (e.g., for address generation that uses $2^{scale}*index+base+displacement$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]—mmmmm) includes content to encode an implied leading opcode byte. W Field 264 (VEX byte 2, bit [7]—W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/ execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5A:
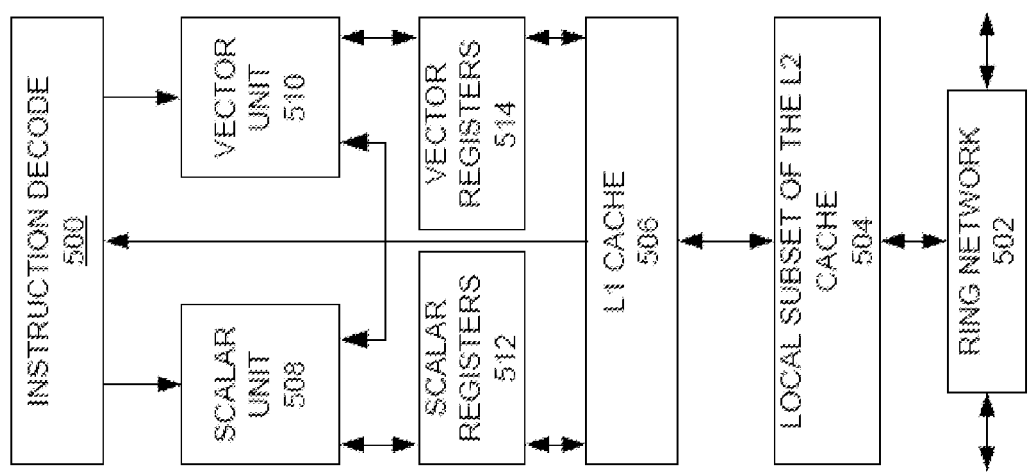
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
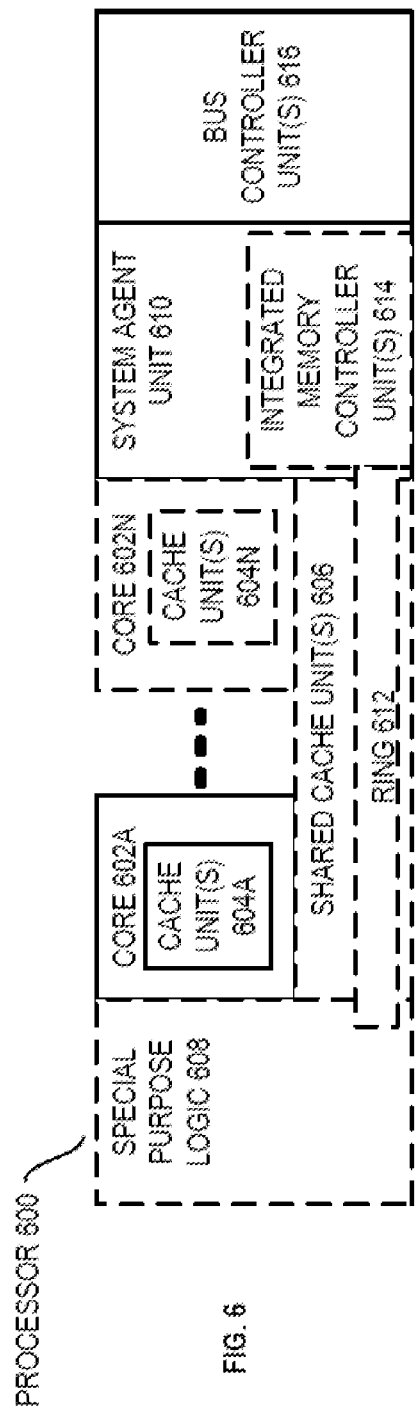
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
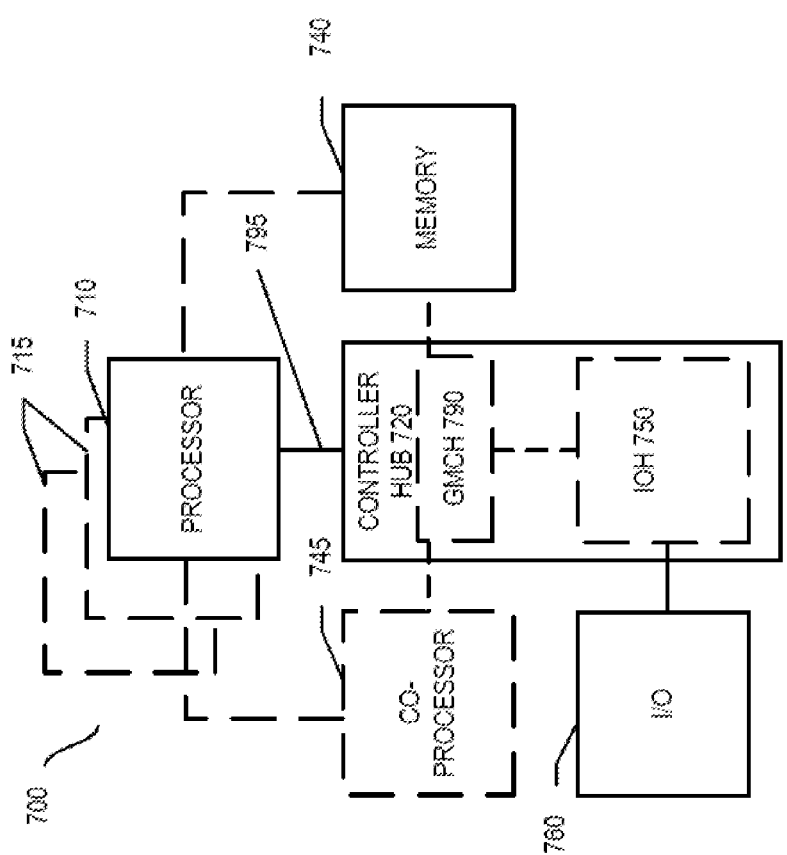
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
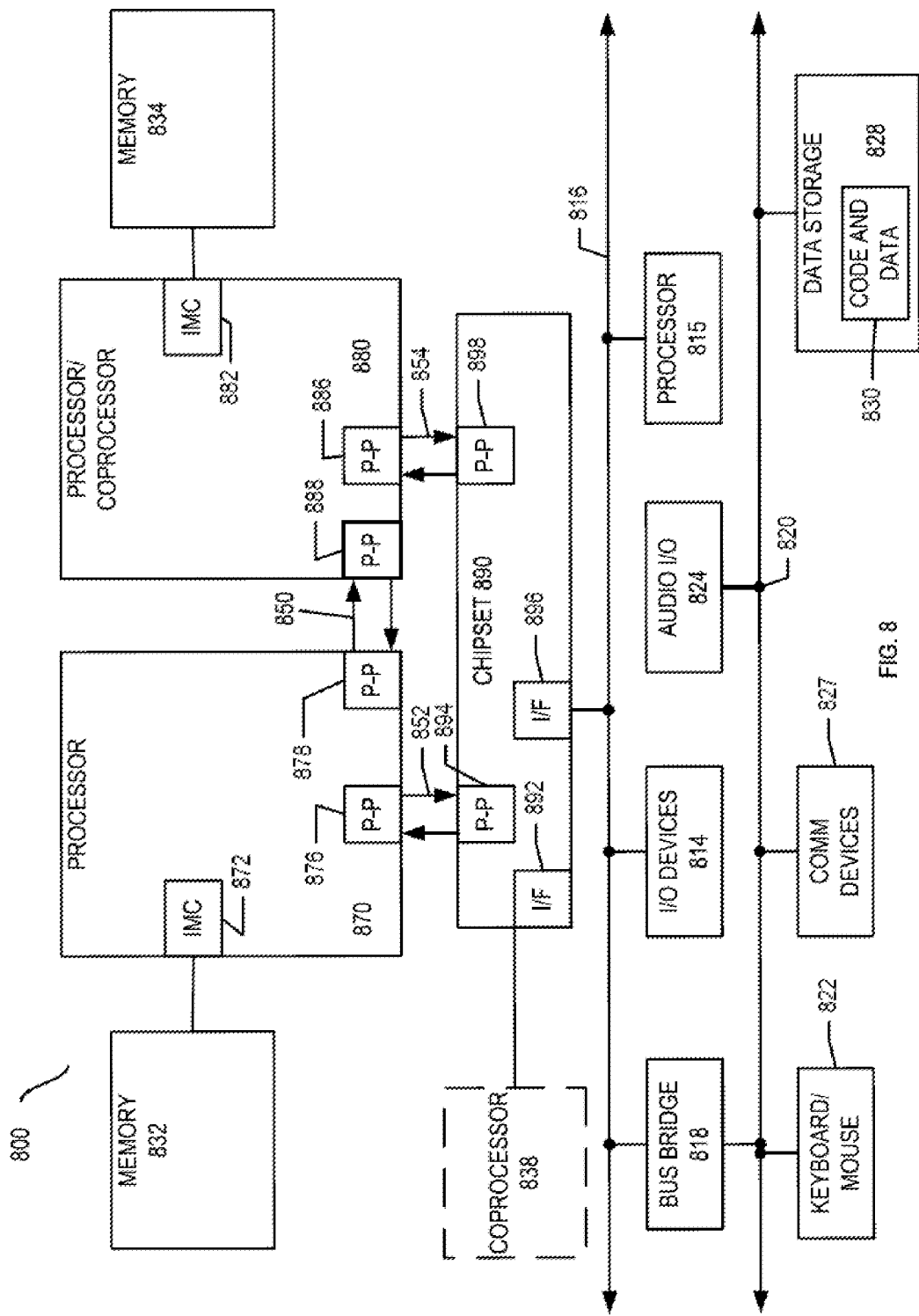
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
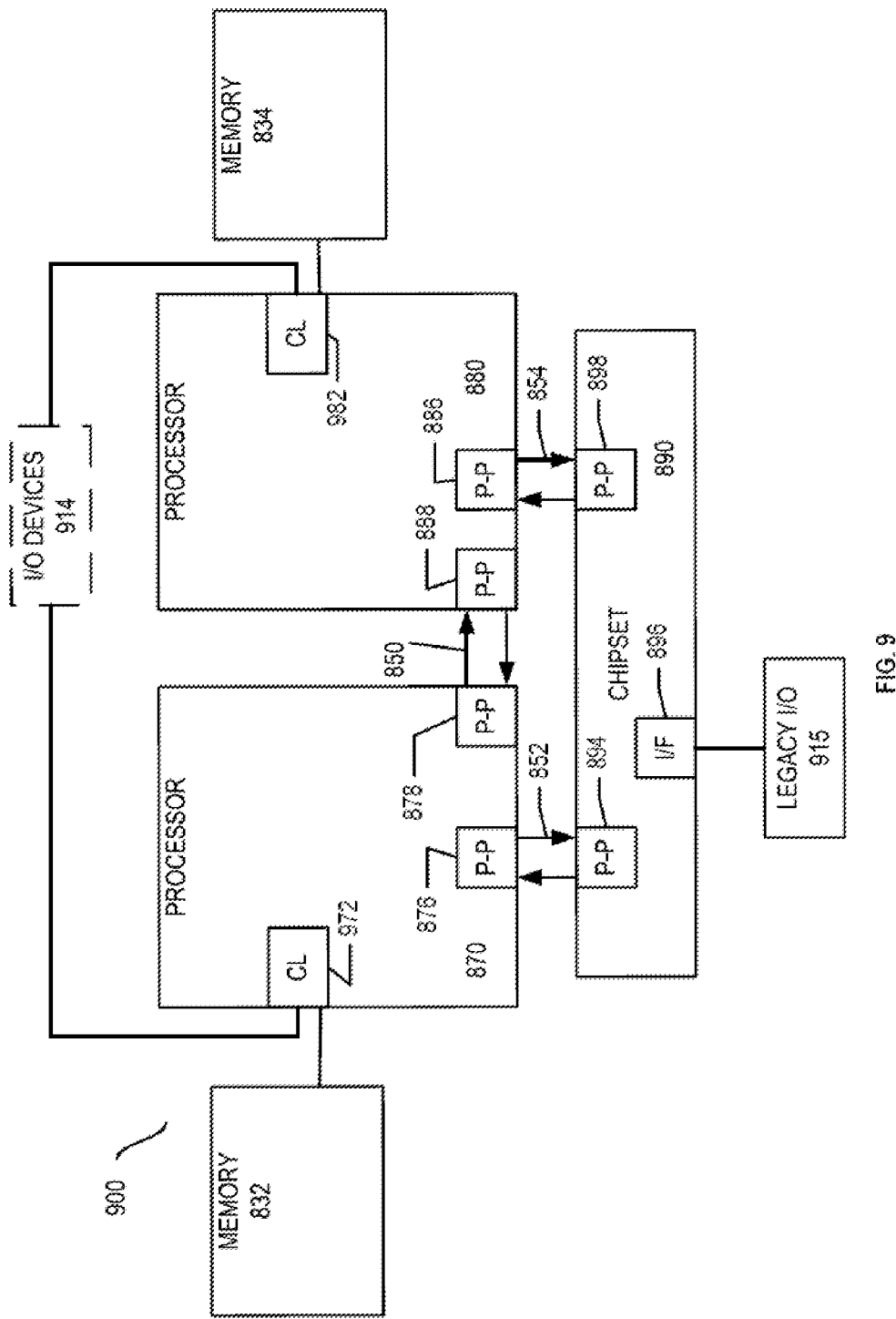
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
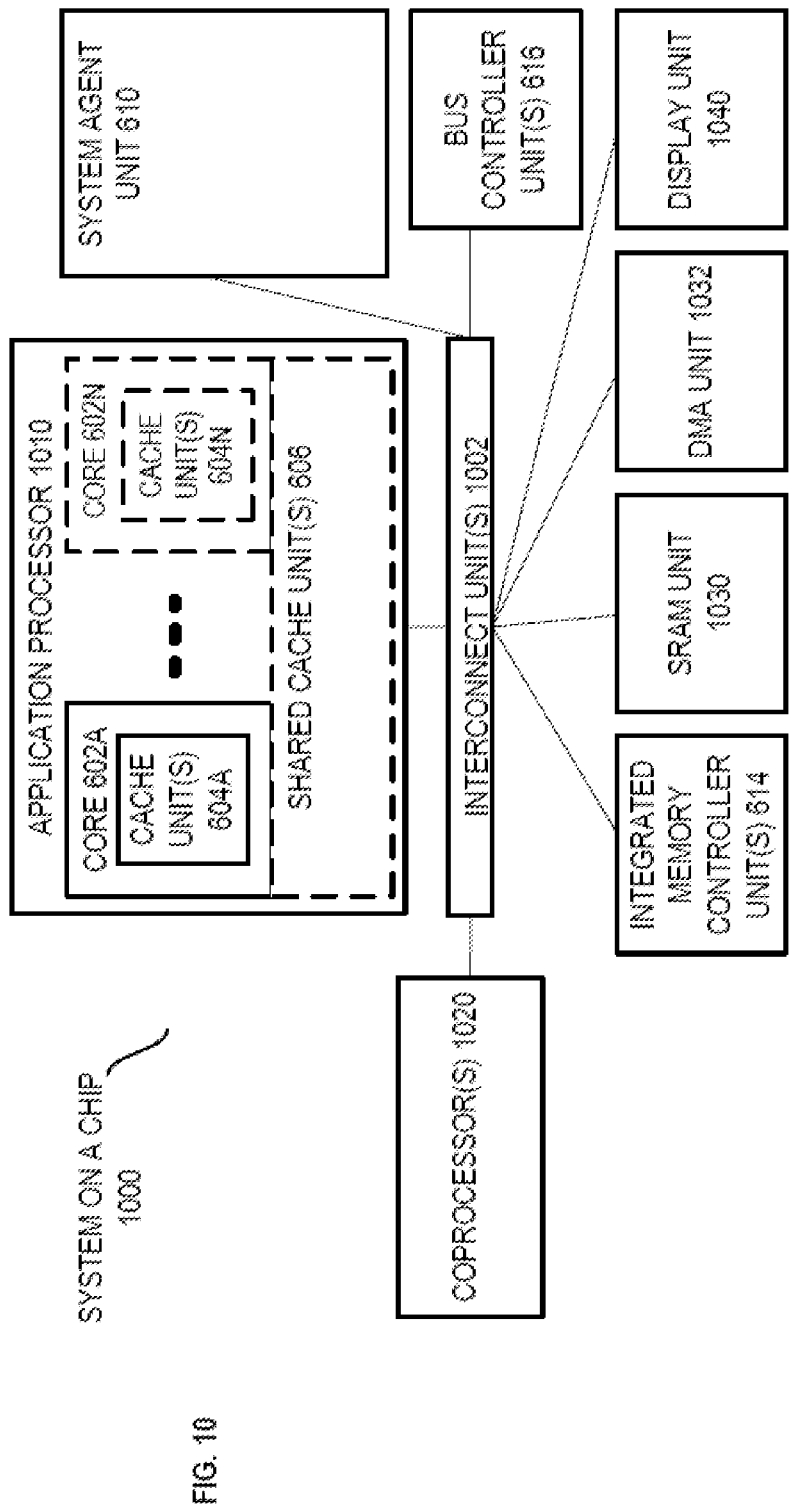
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
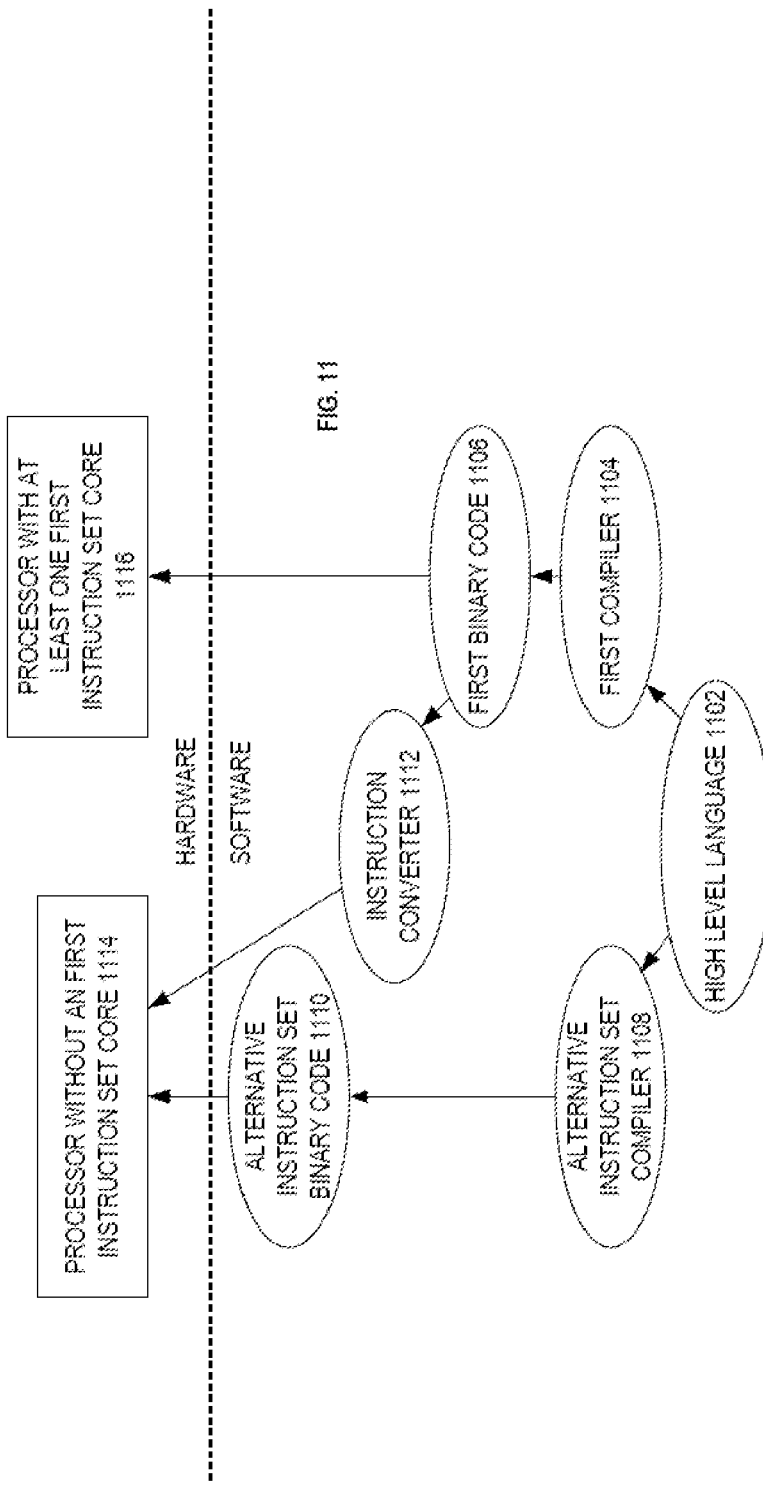
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Apparatus and Method for Vector Multiply and Accumulate of Packed Bytes

Several new instructions are described below. In one embodiment, the circuitry and logic to perform the operations required by the new instructions are integrated within the execution engine unit 450 shown in FIG. 4B, within the various cores described above (see, e.g., cores 602A-N in FIGS. 6 and 10), and/or within the vector unit 510 shown in FIG. 5A. For example, the various source and destination registers may be SIMD registers within the physical register file unit(s) 458 in FIG. 4B and/or vector registers 310 in FIG. 3. The multiplication circuits, adder circuits, accumulation circuits, and other circuitry described below may be integrated within the execution components of the architectures described above including, by way of example and not limitation, the execution unit(s) 462 in FIG. 4B. It should be noted, however, that the underlying principles of the invention are not limited to these specific architectures.

One embodiment comprises a multiply-accumulate (MAC) architecture with eight 16×16-bit multipliers and two 64-bit accumulators, although the underlying principles of the invention are not limited to this particular implementation. The described instruction set architecture (ISA) can process various multiply and MAC operations on 128-bit, 256-bit, or 512-bit vector data comprising 8-bit, 16-bit, 32-bit, or 64-bit data elements which may be integer, fixed point and/or complex data types. In addition, certain instructions perform post-processing of accumulated data by shift, round, and saturate operations.

In one embodiment, the instructions also support a variety of integer and fixed point data types including:
1) a Q31 data type for signals requiring analog to digital conversion (ADC) and digital to analog conversion (DAC) with greater than 16 bits;
2) a Q15 data type;
3) a complex 16-bit data type; and
4) a complex 32-bit data type.

Target applications of the embodiments of the invention include neural networks, classification tasks for computer vision, and speech recognition. Thus, the instructions described may be executed within deep neural networks (DNN), automatic speech recognition (ASR), and sensor fusion with Kalman filtering, to name just a few. Given the sequence of weights $\{w_1, w_2, \ldots w_k\}$ and the input sequence $\{x_1, x_2, x_3, \ldots x_n\}$ many image processing, machine learning tasks require to compute the result sequence $\{y_1, y_2, y_3, \ldots y_{n+1-k}\}$ defined by $y_i = w_1 x_i + w_2 X_{i+1} + \ldots w_k x_{i+k-1}$.

Figure 12:
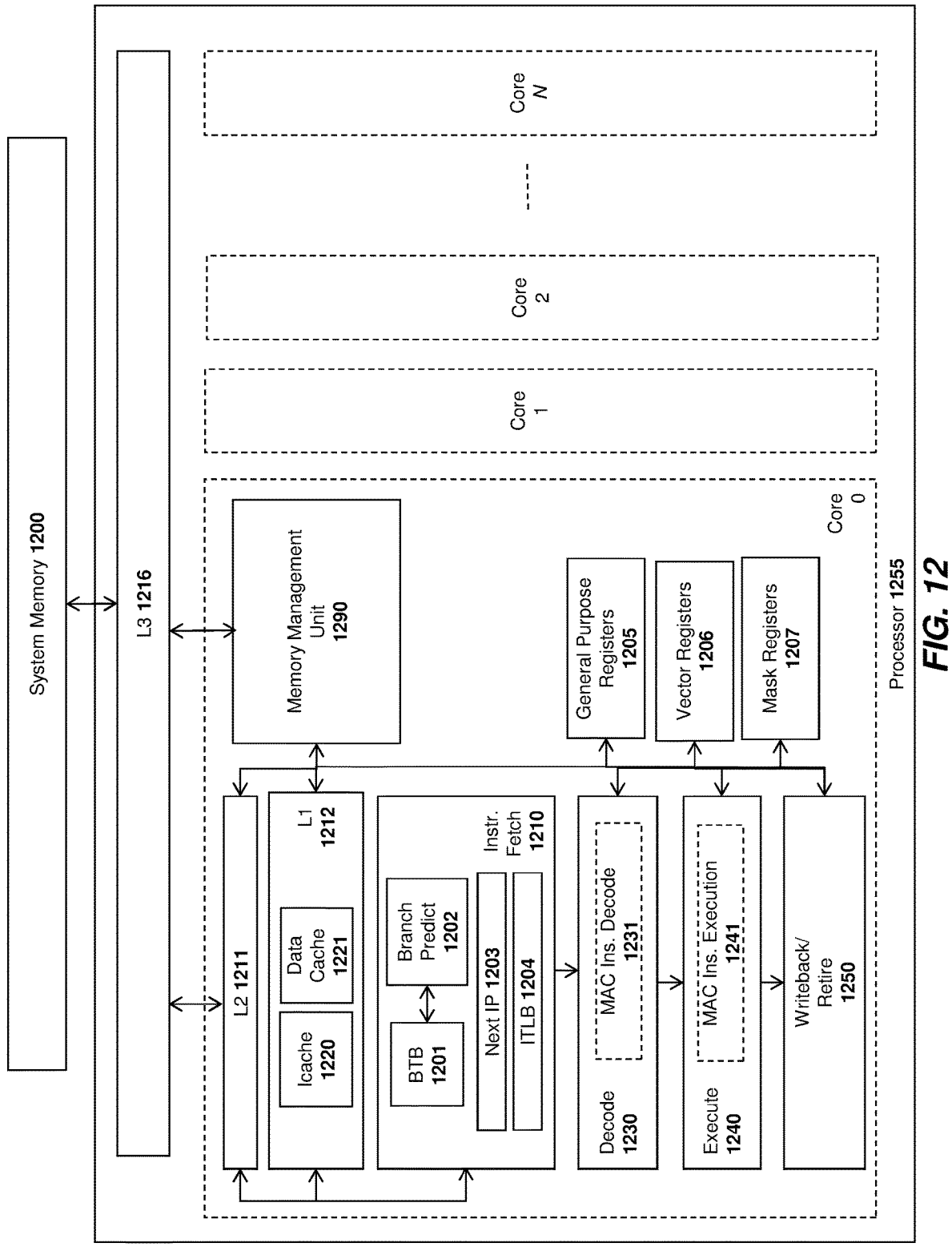
FIG. 12 illustrates a processor architecture on which embodiments of the invention may be implemented.

FIG. 12 illustrates an exemplary processor 1255 on which embodiments of the invention may be implemented which includes a plurality of cores 0-N for simultaneously executing a plurality of instruction threads. The illustrated embodiment includes MAC instruction decode circuitry/logic 1231 within the decoder 1230 and MAC instruction execution circuitry/logic 1341 within the execution unit 1240. These pipeline components may perform the operations described herein responsive to the decoding and execution of the MAC instructions. While details of only a single core (Core 0) are shown in FIG. 12, it will be understood that each of the other cores of processor 1255 may include similar components.

Prior to describing specific details of the embodiments of the invention, a description of the various components of the exemplary processor 1255 are provided directly below. The plurality of cores 0-N may each include a memory management unit 1290 for performing memory operations (e.g., such as load/store operations), a set of general purpose registers (GPRs) 1205, a set of vector registers 1206, and a set of mask registers 1207. In one embodiment, multiple vector data elements are packed into each vector register 1206 which may have a 512 bit width for storing two 256 bit values, four 128 bit values, eight 64 bit values, sixteen 32 bit values, etc. However, the underlying principles of the invention are not limited to any particular size/type of vector data. In one embodiment, the mask registers 1207 include eight 64-bit operand mask registers used for performing bit masking operations on the values stored in the vector registers 1206 (e.g., implemented as mask registers k0-k7 described herein). However, the underlying principles of the invention are not limited to any particular mask register size/type.

Each core 0-N may include a dedicated Level 1 (L1) cache 1212 and Level 2 (L2) cache 1211 for caching instructions and data according to a specified cache management policy. The L1 cache 1212 includes a separate instruction cache 1220 for storing instructions and a separate data cache 1221 for storing data. The instructions and data stored within the various processor caches are managed at the granularity of cache lines which may be a fixed size (e.g., 64, 128, 512 Bytes in length). Each core of this exemplary embodiment has an instruction fetch unit 1210 for fetching instructions from main memory 1200 and/or a shared Level 3 (L3) cache 1216. The instruction fetch unit 1210 includes various well known components including a next instruction pointer 1203 for storing the address of the next instruction to be fetched from memory 1200 (or one of the caches); an instruction translation look-aside buffer (ITLB) 1204 for storing a map of recently used virtual-to-physical instruction addresses to improve the speed of address translation; a branch prediction unit 1202 for speculatively predicting instruction branch addresses; and branch target buffers (BTBs) 1201 for storing branch addresses and target addresses.

As mentioned, a decode unit 1230 includes MAC instruction decode circuitry/logic 1231 for decoding the MAC instructions described herein into micro-operatons or "uops" and the execution unit 1240 includes MAC instruction execution circuitry/logic 1241 for executing the MAC instructions. A writeback/retirement unit 1250 retires the executed instructions and writes back the results.

One implementation includes MAC instructions which multiply the individual bytes of a first source operand by corresponding bytes of a second source operand, producing intermediate word results. The word results are then summed and accumulated with an existing doubleword value in the destination register. One particular version of a MAC instruction performs saturation on the intermediate word results. If the intermediate sum overflows a 32 b signed number, the result is saturated to either 0x7FFF_FFFF for positive numbers of 0x8000_0000 for negative numbers. One implementation uses an EVEX instruction format and supports memory fault suppression.

Figure 13:
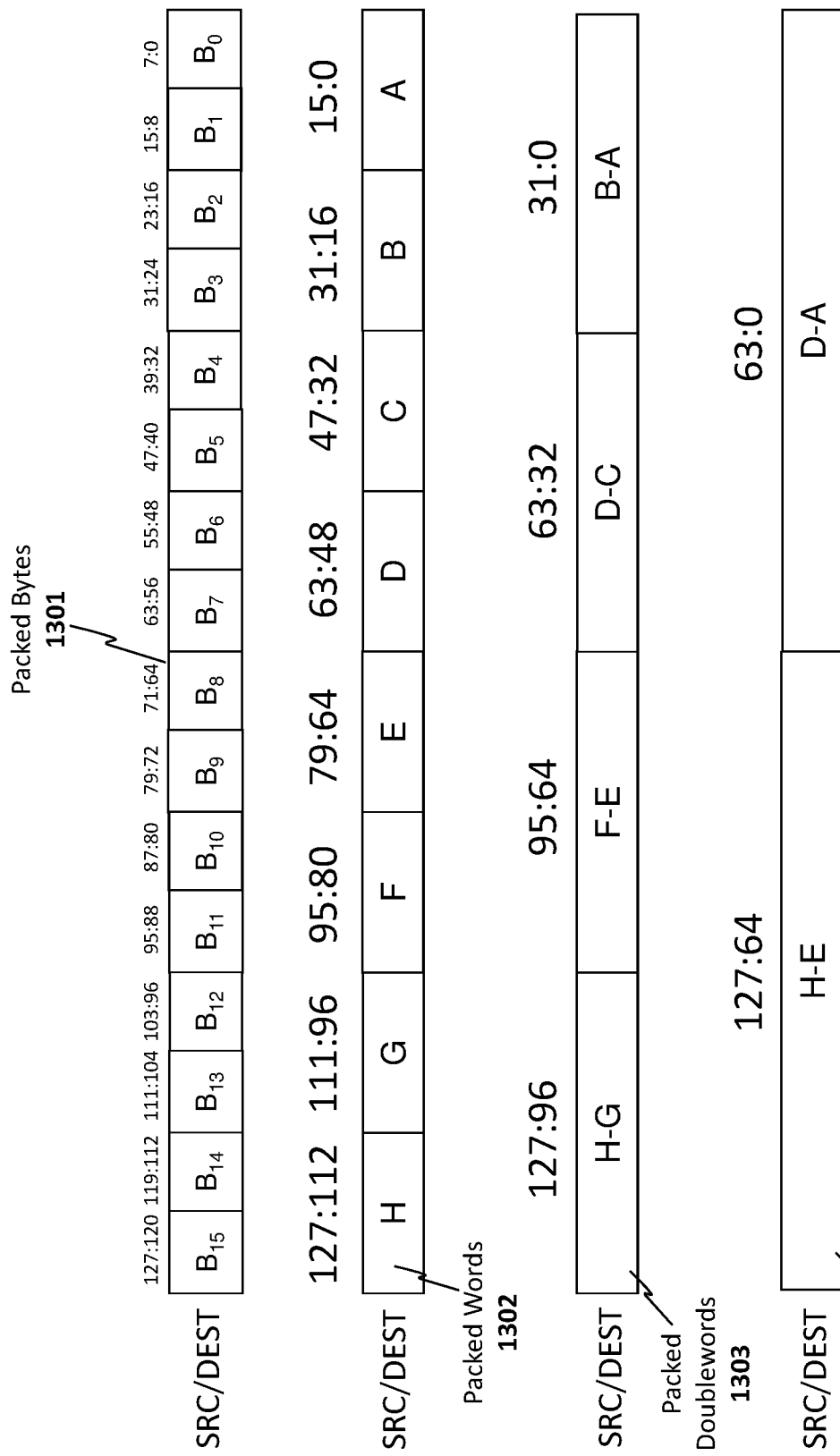
FIG. 13 illustrates a plurality of exemplary packed data element types.

In one embodiment, the xmm1, xmm2, and xmm3 registers are 128-bit packed data registers which store dual quadword values, four doubleword values, eight word values, or sixteen bytes. FIG. 13 illustrates exemplary data element and bit distributions for an exemplary source register and/or destination register. Data elements may be packed into the source register and/or destination register as packed bytes 1301 (8 bits), words 1302 (16 bits), doublewords 1303 (32 bits), and/or quadwords 1304 (64 bits) as illustrated.

Different implementations of the MAC instruction operate using source and destination registers of different sizes including 128-bit registers (e.g., xmm registers), 256-bit registers (e.g., ymm registers), and 512-bit registers (e.g., zmm registers). One embodiment uses one of the following instruction formats to designate the register size to be used:

VPDPBx xmm1, xmm2, xmm3/m128;
VPDPBx ymm1, ymm2, ymm3/m256;
VPDPBx zmm1, zmm2, zmm3/m512;

where x represents different character strings which may be added to the base mnemonic VPDPB to identify different variations of the instruction described herein. In the above example, the first source register is xmm2, ymm2, or zmm2; the second source register is xmm3, ymm3, or zmm3 (or a 128-, 256-, or 512-bit memory location, respectively); and the destination register is xmm1, ymm1, or zmm1, respectively.

Different implementations will be described with respect to the following code sequence. In particular, the various IF/THEN/ELSE statements recited below reflect the different variations of a MAC instruction and/or different MAC instructions.

```
VPDPBUU,SS,SUD,S dest, src1, src2
VL= (128, 256, 512)
KL = VL/32
ORIGDEST := DEST
FOR i := 0 TO KL- 1:
    IF k1[i] or *no writemask* :
        if SRC2 is memory and EVEX.b == 1:
            t := SRC2.dword[0]
        ELSE:
            t := SRC2.dword[i]
        if *src1 is signed*:
            src1extend := SIGN_EXTEND
        else:
            src1extend := ZERO_EXTEND
        if *src2 is signed*:
            src2extend := SIGN_EXTEND
        else:
            src2extend := ZERO_EXTEND
        p1word := src1extend(SRC1.byte[4*i+0]) * src2extend(t.byte[0])
        p2word := src1extend(SRC1.byte[4*i +1]) * src2ext end(t.byte[1])
        p3word := src1extend(SRC1.byte[4*i +2]) * src2ext end(t.byte[2])
        p4word := src1extend(SRC1.byte[4*i +3]) * src2ext end(t.byte[3])
        IF *saturating*:
            IF *UU instruction version*:
                DEST.dword[i] :=
                UNSIGNED_DWORD_SATURATE(ORIGDEST.-
                dword[i] + p1word + p2word + p3word + p4word)
            ELSE:
                DEST.dword [i] :=
                SIGNED_DWORD_SATURATE(ORIGDEST.-
                dword[i] + p1word + p2word + p3word + p4word)
        ELSE:
            DEST.dword[i] := ORIGDEST.dword[i] +
            p1word + p2word + p3word + p4word
    ELSE IF *zeroing*:
        DEST.dword[i] := 0
    ELSE:
        DEST.dword[i] := ORIGDEST.dword[i]
DEST [MAX_VL-1:VL] := 0
```

In the above code, variable VL (vector length) is set to 128, 256, or 512 in accordance with the register widths of 128-bits, 256-bits, and 512-bits, respectively. Depending on the value of VL, variable KL is set to 4, 8, or 16. The variable i identifies the current packed data element being processed. If no writemask is used or if the value in the writemask corresponding to data element i is 1, then variable t is set to doubleword data element i from source 2 (SRC2). Alternatively, if SRC2 is a memory location and EVEX.b bit is 1, variable t is set to data element 0 from SRC2.

If the byte elements in SRC1 and SRC2 are signed, they are sign-extended to words (16 bits). If they are unsigned, the byte elements are zero extended to words. For each value of i, word values p1word, p2word, p3word, and p4word, are generated by multiplying byte[4*i+0] of SRC1 by byte[0] of doubleword[i] of SRC2; byte[4*i+1] of SRC1 by byte[1] of doubleword[i] of SRC2; byte[4*i+2] of SRC1 by byte[2] of doubleword[i] of SRC2; and byte[4*i+3] of SRC1 by byte[3] of doubleword[i] of SRC2, respectively.

The accumulated value (if any) stored in doubleword location [i] of the destination register (DEST.dword[i]) is added to the sum of p1word, p2word, p3word, and p4word. If the instruction calls for saturation, then signed or unsigned saturation is performed on the resulting sum and the result is stored in doubleword location [i] of the destination register. If saturation is not used, then the unsaturated sum is stored in doubleword location [i] of the destination register.

If writemask value k1[i] is set to 0, and zero masking is used, then zeroes are written to the doubleword at location [i] of the destination register. Alternatively, if merge masking is used, then the current value at location [i] is maintained.

Thus, different embodiments of a MAC instruction may include, but are not limited to, the use of a writemask and, if used, whether merge masking or zero masking is used. Additionally, different embodiments may use signed values or unsigned values which may be sign-extended (if signed) or zero-extended (if unsigned). Moreover, saturation may be used including signed doubleword saturation or unsigned doubleword saturation. Other embodiments of a MAC instruction do not use saturation. Further, as mentioned above, a MAC instruction may operate using source and destination registers of different sizes including 128-bit registers (e.g., xmm registers), 256-bit registers (e.g., ymm registers), and 512-bit registers (e.g., zmm registers). One implementation of a processor decodes and executes different MAC instructions which every combination of the above variables (e.g., 512-bit source/destination, merge masking, unsigned, with saturation; 128-bit source/destination, zero masking, signed, saturation; zero masking, signed, no saturation, etc).

An exemplary group of MAC instructions which include different combinations of these variables is illustrated in FIG. 14. This particular group of MAC instructions utilize an EVEX instruction format as described above with respect to FIGS. 1A-B and FIGS. 2A-C. In one implementation, the EVEX prefix is encoded using a four-byte form. The DDS encoding indicates that VEX.vvvv encodes the second source register, xmm2, ymm2, or zmm2, in the three-operand instruction syntax where the content of first source register, xmm1, ymm1, or zmm1, will be overwritten by the result. The numbers following DDS indicate register size and include 128 bit, 256 bit, and 512 bit registers (i.e., xmm, ymm, and zmm registers as described above).

Depending on the instruction, the next value is F2, F3, or NP which identify how the VEX.pp field encodings are mapped. For example, the corresponding VEX.pp value affects the "opcode" byte in the same way as a SIMD prefix (66H, F2H or F3H) does to the ensuing opcode byte. The 0F38 indicator maps to a valid encoding of the VEX.mmmmm field and W0 indicates that VEX.W=0. Various additional details of EVEX and VEX encoding are provided above.

Figure 15:
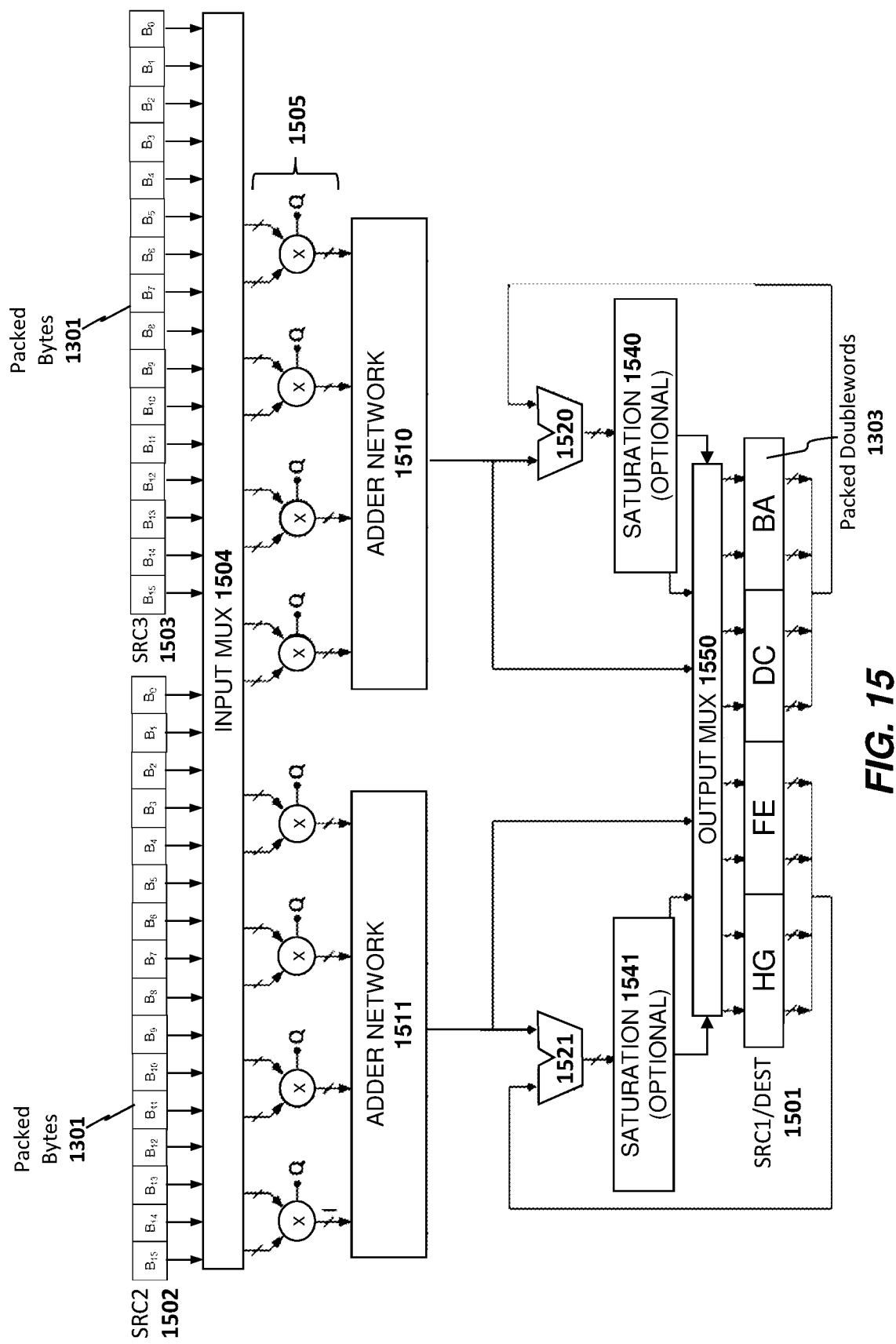
FIG. 15 illustrates an exemplary architecture for executing multiply-accumulate instructions.

FIG. 15 illustrates an exemplary architecture for executing one or more of the MAC instructions which includes first and second source registers, SRC2 and SRC3, 1502 and 1503, respectively, and a third source register which is also the destination register, SRC1/DEST 1501. The illustrated architecture executes various instructions which may have different register sizes (e.g., 128b, 256b, 512b) and/or data element sizes. In the particular example shown in FIG. 15, the registers are 128 bits which store 16 bytes (B0-B15 in SRC2 1502 and SRC3 1503) and four doublewords (elements HG, FE, DC, BA in SRC1/DEST 1501). As mentioned, the source data elements may be signed or unsigned values.

In one implementation, an input multiplexer 1504 routes data elements to a set of parallel multipliers 1505 which multiplies bytes in SRC3 with corresponding bytes in SRC2 (e.g., as described in the code example above). The resulting products may then be sign-extended or zero-extended to words and added by adder networks 1511. Accumulators 1520-1521 add the resulting sums to existing doubleword results stored in SRC1/DEST 1501 to generate final doubleword results. For certain instructions, saturation circuitry 1540-1541 saturates the final doubleword results and output multiplexer 1550 forwards the saturated doubleword results to specified data element locations within SRC1/DEST 1501.

In one particular implementation, the illustrated architecture executes the following set of instructions:
VPDPBSSD xmm1, xmm2, xmm3/m128
VPDPBSSD ymm1, ymm2, ymm3/m256
VPDPBSSD zmm1, zmm2, zmm3/m512
VPDPBSSDS xmm1, xmm2, xmm3/m128
VPDPBSSDS ymm1, ymm2, ymm3/m256
VPDPBSSDS zmm1, zmm2, zmm3/m512
VPDPBSUD xmm1, xmm2, xmm3/m128
VPDPBSUD ymm1, ymm2, ymm3/m256
VPDPBSUD zmm1, zmm2, zmm3/m512
VPDPBSUDS xmm1, xmm2, xmm3/m128
VPDPBSUDS ymm1, ymm2, ymm3/m256
VPDPBSUDS zmm1, zmm2, zmm3/m512
VPDPBUUD xmm1, xmm2, xmm3/m128
VPDPBUUD ymm1, ymm2, ymm3/m256
VPDPBUUD zmm1, zmm2, zmm3/m512
VPDPBUUDS xmm1, xmm2, xmm3/m128
VPDPBUUDS ymm1, ymm2, ymm3/m256
VPDPBUUDS zmm1, zmm2, zmm3/m512

Thus, there are multiple versions of each instruction mnemonic for different register/operand sizes. For example, the VPDPBSSD instruction includes a first version which uses xmm registers/128 bit memory locations, a second version which uses ymm registers/256 bit memory locations, and a third version which uses zmm registers/512 bit memory locations.

The VPDBSSD instruction multiplies the signed bytes of the first source operand in SRC2 1502 by the corresponding signed bytes of the second source operand in SRC3 1503, producing intermediate results which are sign-extended to word results. The word results are then summed by adder networks 1510-1511 and the temporary sum is added to an accumulated doubleword value from SRC1/DEST 1501. The accumulated final result is written to the same doubleword element location in SRC1/DEST 1501.

The VPDPBSSDS instruction operates in the same manner but uses saturation circuits 1540-1541 to perform saturation on the doubleword results, prior to writing the result back to SRC1/DEST.

The VPDPBSUD and VPDPBSUDS instructions perform the same operations as VPDBSSD and VPDBSSDS, respectively, with the exception that bytes from one source are unsigned while bytes from a second source are signed. In one implementation, the accumulated results are also signed.

The VPDPBUUD and VPDPBUUDS instructions perform the same operations as VPDBSSD and VPDBSSDS, respectively, with the exception that bytes from both sources are unsigned. The accumulated results are also unsigned.

While the embodiments described above multiply bytes from source registers, the underlying principles of the invention may be implemented using any other data element sizes including words, doubleword, and quadwords. These instructions are implemented in the same basic manner but with source elements and destination elements that are 2×, 4×, 8×, etc, the size of the byte instructions described above.

One embodiment, for example, includes the instructions VPDPWSSQ and VPDPWSSQS which perform substantially the same operations as VPDPBSSD and VPDPBSSDS, respectively, but multiplying word values from two source registers and accumulating a quadword value in the destination.

Figure 16:
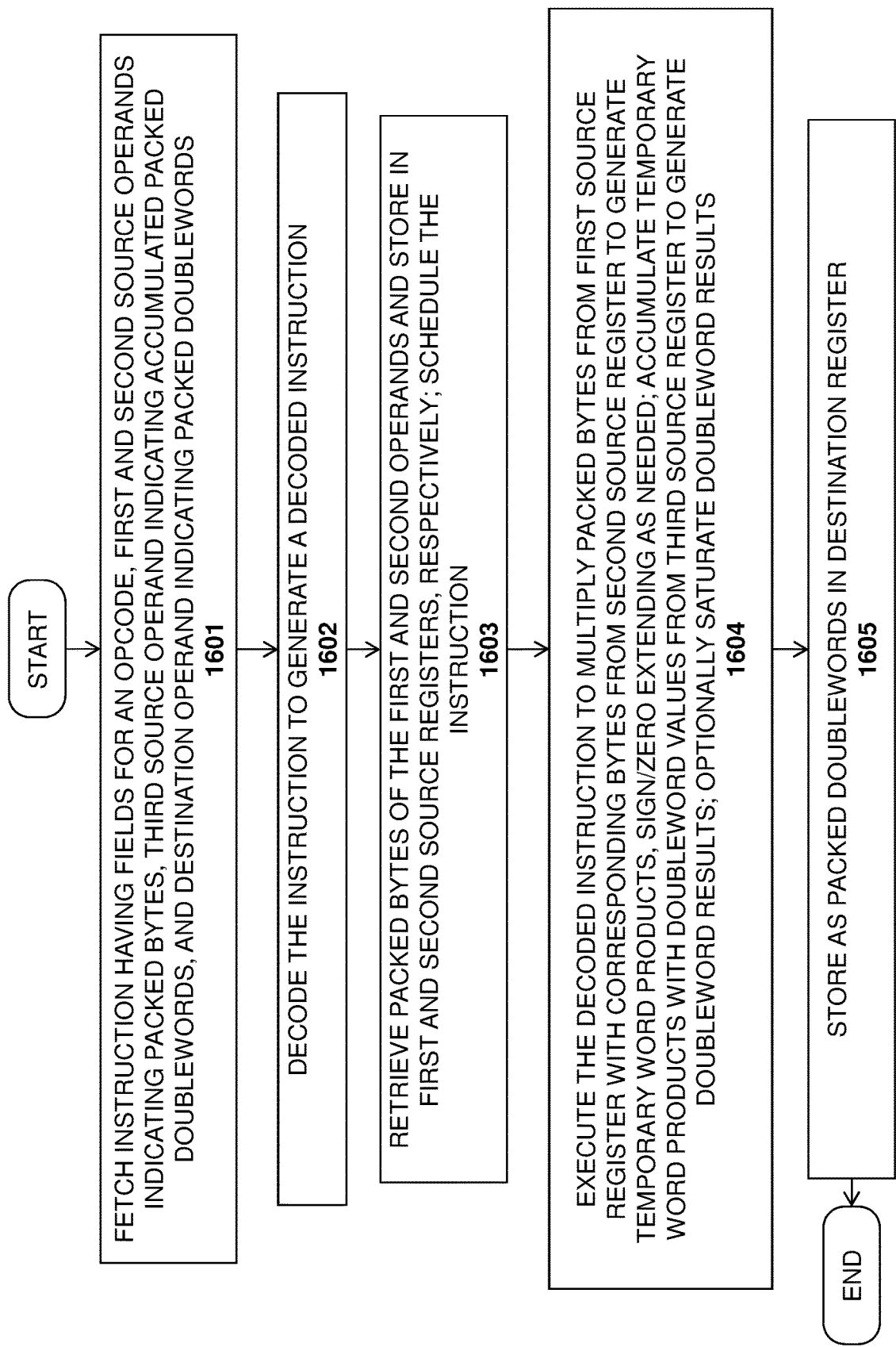
FIG. 16 illustrates a method in accordance with one embodiment of the invention.

A method in accordance with one embodiment of the invention is illustrated in FIG. 16. The method may be implemented within the context of the processor and system architectures described above but is not limited to any particular system architecture.

At 1601, an instruction is fetched having fields for an opcode and first and second source operands indicating packed bytes, a third source operand indicating accumulated doublewords, and a destination operand indicating packed doublewords. At 1602 the instruction is decoded to generate a first decoded instruction (e.g., comprising a plurality of microoperations). At 1603, first and second packed bytes are retrieved and stored in the first and second source registers, respectively (e.g., from memory, a data cache, etc). As mentioned, in one embodiment, the packed bytes are stored in 128-bit, 256-bit, or 512-bit packed data source registers.

At 1604 the decoded instruction is executed to concurrently multiply packed bytes from the first source register with corresponding bytes from the second source register to generate temporary word products. In one embodiment, the product of each pair of bytes may be zero-extended or sign-extended to determine the word values (e.g., sign-extending for signed values and zero-extending for unsigned values). The temporary word products are then summed and added to an accumulated doubleword value from a corresponding doubleword location in the source/destination register. The doubleword results may be saturated and stored back to corresponding doubleword locations in the destination at 1605.

EXAMPLES

The following are exemplary processors, methods, and machine-readable configured to implement multiply accumulate instructions.

Example 1

A processor comprising: a decoder to decode instructions; a first source register to store a first plurality of packed bytes; a second source register to store a second plurality of packed bytes; a third source register to store a plurality of packed doublewords; execution circuitry to execute a first instruction, the execution circuitry comprising: extension circuitry to sign-extend or zero-extend the first and second plurality of packed bytes to generate a first and second plurality of words corresponding to the first and second plurality of packed bytes; multiplier circuitry to multiply each of the first plurality of words with a corresponding one of the second plurality of words to generate a plurality of temporary products; adder circuitry to add at least a first set of the temporary products to generate a first temporary sum; accumulation circuitry to combine the first temporary sum with a first packed doubleword value from a first doubleword location in the third source register to generate a first accumulated doubleword result; a destination register to store the first accumulated doubleword result in the first doubleword location.

Example 2

The processor of Example 1 wherein the destination register and third source register are the same register.

Example 3

The processor of Example 1 further comprising:
saturation circuitry to saturate the first accumulated doubleword result prior to storage in the destination register.

Example 4

The processor of Example 1 wherein the first and second plurality of packed bytes are signed and wherein the extension circuitry is to sign-extend the first and second plurality of packed bytes.

Example 5

The processor of Example 1 wherein the first, second, and third source registers comprise 128-bit, 256-bit, or 512-bit registers to store 16 bytes, 32 bytes, or 64 bytes, respectively and/or to store 4 doublewords, 8 doublewords, or 16 doublewords, respectively.

Example 6

The processor of Example 1 further comprising: masking circuitry to evaluate a writemask comprising a plurality of bits, each bit associated with a packed data element location in the destination register.

Example 7

The processor of Example 6 wherein the masking circuitry to determine whether to write the first accumulated doubleword result to the destination register upon detecting a value of a writemask bit associated with the first doubleword location.

Example 8

The processor of Example 7 wherein if the masking circuitry determines not to write the first accumulated doubleword result, then either zeroes are written to the first doubleword location or no update to the first doubleword location is performed.

Example 9

A method comprising: decoding an instruction; executing the instruction by: sign-extending or zero-extending first and second plurality of packed bytes from first and second source registers to generate a first and second plurality of words corresponding to the first and second plurality of packed bytes; multiplying each of the first plurality of words with a corresponding one of the second plurality of words to generate a plurality of temporary products; adding at least a first set of the temporary products to generate a first temporary sum; accumulating the first temporary sum with a first packed doubleword value from a first doubleword location in a third source register to generate a first accumulated doubleword result; storing the first accumulated doubleword result in the first doubleword location in a destination register.

Example 10

The method of Example 9 wherein the destination register and third source register are the same register.

Example 11

The method of Example 9 further comprising: saturating the first accumulated doubleword result prior to storage in the destination register.

Example 12

The method of Example 9 wherein the first and second plurality of packed bytes are signed and wherein the first and second plurality of packed bytes are to be sign-extended.

Example 13

The method of Example 9 wherein the first, second, and third source registers comprise 128-bit, 256-bit, or 512-bit registers to store 16 bytes, 32 bytes, or 64 bytes, respectively and/or to store 4 doublewords, 8 doublewords, or 16 doublewords, respectively.

Example 14

The method of Example 9 further comprising: evaluating a writemask comprising a plurality of bits, each bit associated with a packed data element location in the destination register.

Example 15

The method of Example 14 further comprising:
determining whether to write the first accumulated doubleword result to the destination register upon detecting a value of a writemask bit associated with the first doubleword location.

Example 16

The method of Example 15 if a determination is made to not write the first accumulated doubleword result, then either zeroes are written to the first doubleword location or no update to the first doubleword location is performed.

Example 17

An article of manufacture having program code stored thereon which, when executed by a machine, causes the machine to perform the operations of: decoding an instruction; executing the instruction by: sign-extending or zero-extending first and second plurality of packed bytes from first and second source registers to generate a first and second plurality of words corresponding to the first and second plurality of packed bytes; multiplying each of the first plurality of words with a corresponding one of the second plurality of words to generate a plurality of temporary products; adding at least a first set of the temporary products to generate a first temporary sum; accumulating the first temporary sum with a first packed doubleword value from a first doubleword location in a third source register to generate a first accumulated doubleword result; storing the first accumulated doubleword result in the first doubleword location in a destination register.

Example 18

The article of manufacture of Example 17 wherein the destination register and third source register are the same register.

Example 19

The article of manufacture of Example 17 further comprising program code to cause the machine to perform the operation of:
saturating the first accumulated doubleword result prior to storage in the destination register.

Example 20

The article of manufacture of Example 17 wherein the first and second plurality of packed bytes are signed and wherein the first and second plurality of packed bytes are to be sign-extended.

Example 21

The article of manufacture of Example 17 wherein the first, second, and third source registers comprise 128-bit, 256-bit, or 512-bit registers to store 16 bytes, 32 bytes, or 64 bytes, respectively and/or to store 4 doublewords, 8 doublewords, or 16 doublewords, respectively.

Example 22

The article of manufacture of Example 17 further comprising program code to cause the machine to perform the operation of:
evaluating a writemask comprising a plurality of bits, each bit associated with a packed data element location in the destination register.

Example 23

The article of manufacture of Example 22 further comprising program code to cause the machine to perform the operation of:
determining whether to write the first accumulated doubleword result to the destination register upon detecting a value of a writemask bit associated with the first doubleword location.

Example 24

The article of manufacture of Example 23 if a determination is made to not write the first accumulated doubleword result, then either zeroes are written to the first doubleword location or no update to the first doubleword location is performed.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a decoder to decode an instruction, the instruction comprising fields to identify a first operand to indicate a first plurality of packed bytes, a second operand to indicate a second plurality of packed bytes, and a third operand to indicate a plurality of packed doublewords, the instruction further comprising an opcode to indicate whether bytes in the first plurality of packed bytes are signed and whether bytes in the second plurality of packed bytes are signed;
a first source register to store the first plurality of packed bytes;
a second source register to store the second plurality of packed bytes;
a third source register to store the plurality of packed doublewords;
execution circuitry to execute the instruction, the execution circuitry comprising:
extension circuitry to sign-extend or zero-extend the first and second plurality of packed bytes based on the opcode to generate a first and second plurality of words corresponding to the first and second plurality of packed bytes;
multiplier circuitry to multiply each of the first plurality of words with a corresponding one of the second plurality of words to generate multiple sets of temporary products, each set comprising four temporary products;
adder circuitry to add the four temporary products in each set to generate a plurality of temporary sums, each of the temporary sums corresponding to a different set of the temporary products and to a doubleword location in the third source register; and
accumulation circuitry to combine each of the plurality of temporary sums with a respective packed doubleword value from the corresponding doubleword location in the third source register to generate a plurality of accumulated doubleword results;
and
a destination register to store each of the plurality of accumulated doubleword results in the corresponding doubleword location,
wherein operations of the extension circuitry, multiplier circuitry, adder circuitry, and accumulation circuitry are performed responsive to a single execution of the instruction by the execution circuitry.

2. The processor of claim 1 wherein the destination register and third source register are the same register.

3. The processor of claim 1 further comprising:
saturation circuitry to saturate each of the plurality of accumulated doubleword results prior to storage in the destination register.

4. The processor of claim 1 wherein the first and second plurality of packed bytes are signed and wherein the extension circuitry is to sign-extend the first and second plurality of packed bytes.

5. The processor of claim 1 wherein the first, second, and third source registers comprise 128-bit, 256-bit, or 512-bit registers to store 16 bytes, 32 bytes, or 64 bytes, respectively and/or to store 4 doublewords, 8 doublewords, or 16 doublewords, respectively.

6. The processor of claim 1 further comprising:
masking circuitry to evaluate a writemask comprising a plurality of bits, each bit associated with a packed data element location in the destination register.

7. The processor of claim 6 wherein the masking circuitry to determine whether to write a first accumulated doubleword result to the destination register upon detecting a value of a writemask bit associated with a first doubleword location corresponding to the first accumulated doubleword result.

8. The processor of claim 7 wherein if the masking circuitry determines not to write the first accumulated doubleword result, then either zeroes are written to the first doubleword location or no update to the first doubleword location is performed.

9. A method comprising:
decoding an instruction, the instruction comprising fields to identify a first operand to indicate a first plurality of packed bytes, a second operand to indicate a second plurality of packed bytes, and a third operand to indicate a plurality of packed doublewords, the instruction further comprising an opcode to indicate whether bytes in the first plurality of packed bytes are signed and whether bytes in the second plurality of packed bytes are signed; and
executing the instruction by:
sign-extending or zero-extending first and second plurality of packed bytes from first and second source registers based on the opcode to generate a first and second plurality of words corresponding to the first and second plurality of packed bytes;
multiplying each of the first plurality of words with a corresponding one of the second plurality of words to generate multiple sets of temporary products, each set comprising four temporary products;
adding the four temporary products in each set to generate a plurality of temporary sums, each of the temporary sums corresponding to a different set of the temporary products and to a doubleword location in a third source register;
accumulating each of the plurality of temporary sums with a respective packed doubleword value from the corresponding doubleword location in a third source register to generate a plurality of accumulated doubleword results; and
storing each of the plurality of accumulated doubleword results in the corresponding doubleword location in a destination register.

10. The method of claim 9 wherein the destination register and third source register are the same register.

11. The method of claim 9 further comprising:
saturating each of the plurality of accumulated doubleword result prior to storage in the destination register.

12. The method of claim 9 wherein the first and second plurality of packed bytes are signed and wherein the first and second plurality of packed bytes are to be sign-extended.

13. The method of claim 9 wherein the first, second, and third source registers comprise 128-bit, 256-bit, or 512-bit registers to store 16 bytes, 32 bytes, or 64 bytes, respectively and/or to store 4 doublewords, 8 doublewords, or 16 doublewords, respectively.

14. The method of claim 9 further comprising:
evaluating a writemask comprising a plurality of bits, each bit associated with a packed data element location in the destination register.

15. The method of claim 14 further comprising:
determining whether to write a first accumulated doubleword result to the destination register upon detecting a value of a writemask bit associated with a first doubleword location corresponding to the first accumulated doubleword result.

16. The method of claim 15 if a determination is made to not write the first accumulated doubleword result, then either zeroes are written to the first doubleword location or no update to the first doubleword location is performed.

17. An article of manufacture having program code stored thereon which, when executed by a machine, causes the machine to perform the operations of:
  decoding an instruction, the instruction comprising fields to identify a first operand to indicate a first plurality of packed bytes, a second operand to indicate a second plurality of packed bytes, and a third operand to indicate a plurality of packed doublewords, the instruction further comprising an opcode to indicate whether bytes in the first plurality of packed bytes are signed and whether bytes in the second plurality of packed bytes are signed; and
  executing the decoded instruction by:
    sign-extending or zero-extending first and second plurality of packed bytes from first and second source registers based on the opcode to generate a first and second plurality of words corresponding to the first and second plurality of packed bytes;
    multiplying each of the first plurality of words with a corresponding one of the second plurality of words to generate multiple sets of temporary products, each set comprising four temporary products;
    adding the four temporary products in each set to generate a plurality of temporary sums, each of the temporary sums corresponding to a different set of the temporary products and to a doubleword location in a third source register;
    accumulating each of the plurality of temporary sums with a respective packed doubleword value from the corresponding doubleword location in a third source register to generate a plurality of accumulated doubleword results; and
    storing each of the plurality of accumulated doubleword results in the corresponding doubleword location in a destination register.

18. The article of manufacture of claim 17 wherein the destination register and third source register are the same register.

19. The article of manufacture of claim 17 further comprising program code to cause the machine to perform the operation of:
  saturating each of the plurality of accumulated doubleword result prior to storage in the destination register.

20. The article of manufacture of claim 17 wherein the first and second plurality of packed bytes are signed and wherein the first and second plurality of packed bytes are to be sign-extended.

21. The article of manufacture of claim 17 wherein the first, second, and third source registers comprise 128-bit, 256-bit, or 512-bit registers to store 16 bytes, 32 bytes, or 64 bytes, respectively and/or to store 4 doublewords, 8 doublewords, or 16 doublewords, respectively.

22. The article of manufacture of claim 17 further comprising program code to cause the machine to perform the operation of:
  evaluating a writemask comprising a plurality of bits, each bit associated with a packed data element location in the destination register.

23. The article of manufacture of claim 22 further comprising program code to cause the machine to perform the operation of:
  determining whether to write a first accumulated doubleword result to the destination register upon detecting a value of a writemask bit associated with a first doubleword location corresponding to the first accumulated doubleword result.

24. The article of manufacture of claim 23 if a determination is made to not write the first accumulated doubleword result, then either zeroes are written to the first doubleword location or no update to the first doubleword location is performed.

* * * * *